United States Patent
Ito et al.

(10) Patent No.: US 12,316,204 B2
(45) Date of Patent: May 27, 2025

(54) REFLIEF VALVE CONFIGURATION IN VEHICLE DRIVING APPARATUS

(71) Applicant: TOYOTA JIDOSHA KABUSHIKI KAISHA, Toyota (JP)

(72) Inventors: Sho Ito, Toyota (JP); Seitaro Nobuyasu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/861,398

(22) Filed: Jul. 11, 2022

(65) Prior Publication Data

US 2023/0019963 A1 Jan. 19, 2023

(30) Foreign Application Priority Data

Jul. 13, 2021 (JP) ................... 2021-116009

(51) Int. Cl.
*H02K 9/193* (2006.01)
*B60K 6/26* (2007.10)

(52) U.S. Cl.
CPC ............. *H02K 9/193* (2013.01); *B60K 6/26* (2013.01); *B60Y 2200/92* (2013.01); *B60Y 2306/05* (2013.01); *B60Y 2400/60* (2013.01)

(58) Field of Classification Search
CPC .......... H02K 9/193; H02K 7/116; H02K 9/19; B60K 6/26; B60K 6/405; B60K 6/445; B60K 6/24; B60K 6/36; B60K 6/365; B60Y 2200/92; B60Y 2306/05; B60Y 2400/60; Y02T 10/62; F16H 57/08; F16H 57/0412; F16H 57/0413; F16H 57/0436; F16H 57/0475

See application file for complete search history.

(56) References Cited

U.S. PATENT DOCUMENTS 4,736,768 A * 4/1988 Tsubouchi .......... F16K 17/0433
137/533.13
2021/0095690 A1 4/2021 Sun et al.

FOREIGN PATENT DOCUMENTS

| JP | 2013-177030 A |   | 9/2013 |
| JP | 2014145476 A | * | 8/2014 |
| JP | 2021-055723 A |   | 4/2021 |

OTHER PUBLICATIONS

JP2014145476A English translation (Year: 2024).*

* cited by examiner

*Primary Examiner* — Christopher M Koehler
*Assistant Examiner* — Viswanathan Subramanian
(74) *Attorney, Agent, or Firm* — Sughrue Mion, PLLC

(57) ABSTRACT

A vehicle driving apparatus includes: a rotating machine; a cover covering the rotating machine and including a thick portion having a predetermined thickness in a direction of a rotation axis of the rotating machine; an oil pump attached to the cover; and a relief valve provided in the cover, and configured to discharge an oil supplied from the oil pump. The relief valve includes a cylinder room that is provided in the thick portion. The thick portion is provided with at least one cutout extending from an inner wall of the cylinder room in a direction substantially perpendicular to the rotation axis. The cover is provided with at least one rib each of which is disposed in a position opposed to a corresponding one of the at least one cutout and extends in the direction of the rotation axis.

5 Claims, 5 Drawing Sheets

REFLIEF VALVE CONFIGURATION IN VEHICLE DRIVING APPARATUS

This application claims priority from Japanese Patent Application No. 2021-116009 filed on Jul. 13, 2021, the disclosure of which is herein incorporated by reference in its entirety.

FIELD OF THE INVENTION

The present invention relates to a vehicle driving apparatus including a rotating machine.

BACKGROUND OF THE INVENTION

There is known a vehicle driving apparatus that includes a rotating machine. JP 2021-55723 A discloses an example of such a vehicle driving apparatus in which a cover, which covers the rotating machine and an oil pump, is provided with a relief valve that is configured to discharge an oil supplied from the oil pump when a hydraulic pressure of the oil is excessively high.

SUMMARY OF THE INVENTION

By the way, in the vehicle driving apparatus disclosed in the above-identified Japanese Patent Application Publication, the oil discharged from a discharge port of the relief valve is not adapted to be released toward the rotating machine, so that the rotating machine cannot be efficiently cooled by the oil discharged from the relief valve.

The present invention was made in view of the background art described above. It is therefore an object of the present invention to provide a vehicle driving apparatus including a rotating machine and a relief valve that is configured to discharge an oil supplied from the oil pump when a hydraulic pressure of the oil exceeds a predetermined value, wherein the vehicle driving apparatus is capable of efficiently cooling the rotating machine by the oil discharged from the relief valve.

The above is object is achieved according to the following aspects of the present invention.

According to a first aspect of the invention, there is provided a vehicle driving apparatus comprising: a rotating machine; a cover covering the rotating machine and including a thick portion having a predetermined thickness in a direction of a rotation axis of the rotating machine; an oil pump attached to the cover; and a relief valve provided in the cover, and configured to discharge an oil supplied from the oil pump when a hydraulic pressure of the oil exceeds a predetermined value, wherein the cover is disposed to be adjacent to the rotating machine in the direction of the rotation axis of the rotating machine, and has an attitude substantially perpendicular to the rotation axis, wherein the relief valve includes a cylinder room that is provided in the thick portion, wherein the thick portion is provided with at least one cutout extending from an inner wall of the cylinder room in a direction substantially perpendicular to the rotation axis, and wherein the cover is provided with at least one rib each of which is disposed in a position opposed to a corresponding one of the at least one cutout and extends in the direction of the rotation axis.

According to a second aspect of the invention, in the vehicle driving apparatus according to the first aspect of the invention, the at least one cutout extends along a straight line which passes a center of the cylinder room and which is substantially perpendicular to the rotation axis, as viewed in the direction of the rotation axis, wherein the at least one rib overlaps with the straight line, as viewed in the direction of the rotation axis.

According to a third aspect of the invention, in the vehicle driving apparatus according to the first or second aspect of the invention, the at least one cutout includes a first cutout and a second cutout that are disposed in respective positions that are symmetrical with each other with respect to a center of the cylinder room, as viewed in the direction of the rotation axis, wherein the at least one rib includes a first rib and a second rib that are disposed in respective positions that are opposed to the first cutout and the second cutout, respectively, as viewed in the direction of the rotation axis.

According to a fourth aspect of the invention, in the vehicle driving apparatus according to any one of the first through third aspects of the invention, the relief valve includes: a sleeve which is disposed inside the cylinder room and which is slidable relative to the inner wall of the cylinder room; a spring which is disposed inside the sleeve and which forces the sleeves toward a valve closing position that closes the relief valve; and a plate member which is attached to a top portion of the thick portion and which closes an opening of the cylinder room.

According to a fifth aspect of the invention, in the vehicle driving apparatus according to the fourth aspect of the invention, the plate member, which is attached to the top portion of the thick portion, includes a bent portion that is fitted in one of the at least one cutout.

In the vehicle driving apparatus according to the first aspect of the invention, when the hydraulic pressure of the oil supplied from the oil pump exceeds the predetermined value, the relief valve is opened whereby the oil is discharged through the at least one cutout provided in the thick portion. Since each of the at least one rib is disposed in the position opposed to the corresponding one of the at least one cutout, the oil discharged through the at least one cutout collides with the at least one rib whereby a direction of flow of the oil is changed to the direction of the rotation axis. Consequently, the oil is released toward the rotating machine in the direction of the rotation axis so that the rotating machine can be efficiently cooled by the oil.

In the vehicle driving apparatus according to the second aspect of the invention, the at least one cutout extends along the straight line which passes the center of the cylinder room and which is substantially perpendicular to the rotation axis, so that the oil discharged from the cylinder room through the at least one cutout is released along the straight line. Further, the at least one rib is disposed in a position that overlaps with the straight line, so that the oil discharged through the at least one cutout collides with the at least one rib whereby the direction of flow of the oil is changed by the at least one rib to the direction of the rotation axis.

In the vehicle driving apparatus according to the third aspect of the invention, the at least one cutout includes the first and second cutouts that are disposed in the respective positions that are symmetrical with each other with respect to the center of the cylinder room, as viewed in the direction of the rotation axis, so that the oil is discharged through the first and second cutouts disposed in the respective positions that are symmetrical with each other. Consequently, it is possible to suppress inclination of each component of the relief valve which is disposed in the cylinder room, and accordingly to reduce wear that could be caused by collision of the inclined component with the inner wall of the cylinder room.

In the vehicle driving apparatus according to the fourth aspect of the invention, the relief valve is normally placed in its closed state with the sleeve being forced by the spring toward the valve closing position, and is switched to its open state with the sleeve being moved against basing force of the spring toward a valve opening position that opens the relief valve when the hydraulic pressure of the oil supplied from the oil pump exceeds the predetermined value. Thus, the relief valve is practically useful owing to the arrangement in which the relief valve is switched between the closed and open positions depending on the hydraulic pressure of the oil supplied from the oil pump.

In the vehicle driving apparatus according to the fifth aspect of the invention, the plate member is prevented from being rotated, by the bent portion of the plate member that is fitted in the cutout, so that the plate member can be fixed to the thick portion even with a single screw bolt.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
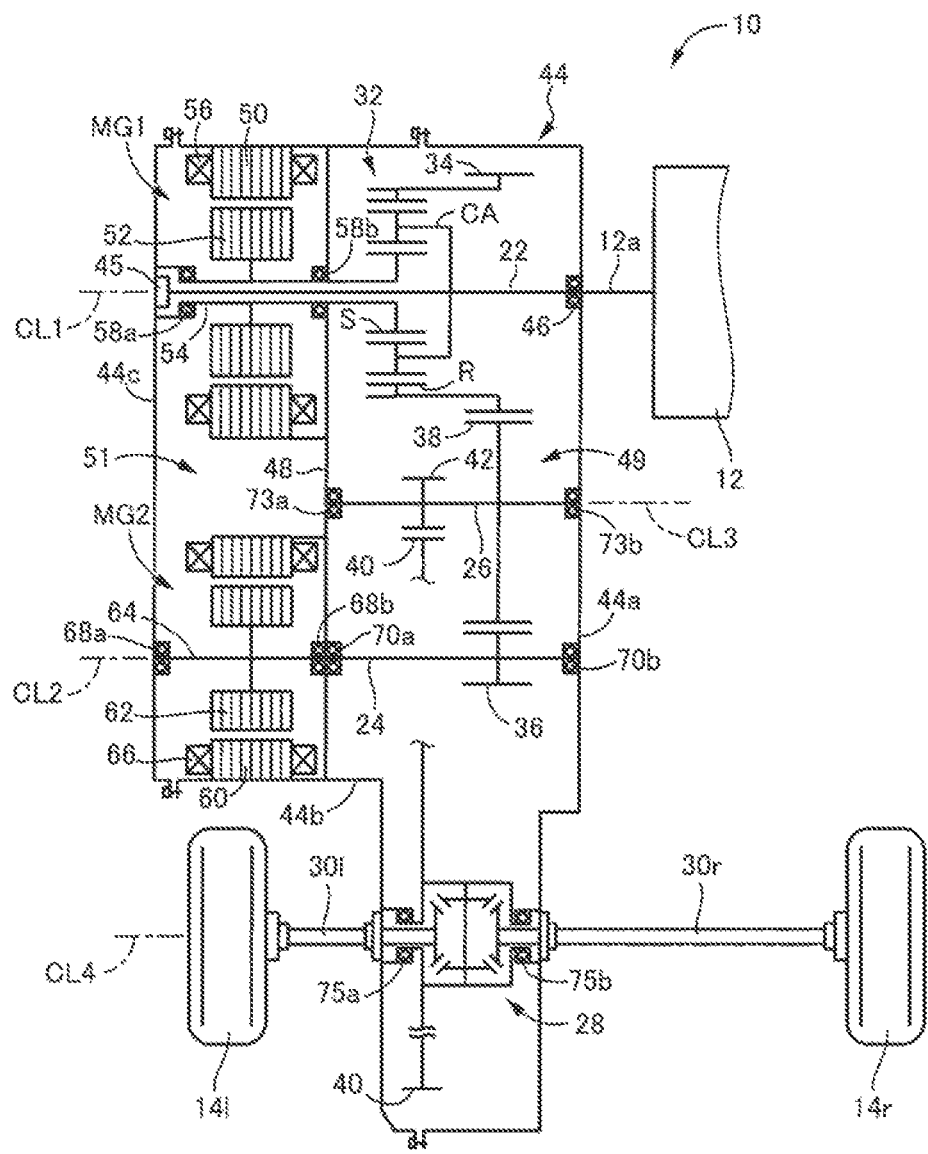
FIG. 1 is a view schematically showing construction of a vehicle driving apparatus to which the present invention is applied.

FIG. 1 is a view schematically showing construction of a vehicle driving apparatus 10 to which the present invention is applied. The driving apparatus 10 is configured to transmit powers of drive power sources in the form of an engine 12 and a second rotating machine MG2, to right and left front wheels 14r, 14l (hereinafter referred simply to as "front wheels 14" unless they are to be distinguished from each other). The driving apparatus 10 is to be advantageously used for a hybrid vehicle with FF (front engine/front drive) system. It is noted that the term "power" corresponds to "force" or "drive power" in description of the present specification.

The driving apparatus 10 includes an input shaft 22 disposed to be rotatable about a first rotation axis CL1 (hereinafter referred to as "first axis CL1"), a power transmission shaft 24 disposed to be rotatable about a second rotation axis CL2 (hereinafter referred to as "second axis CL2"), a counter shaft 26 disposed to be rotatable about a third rotation axis CL3 (hereinafter referred to as "third axis CL3"), a differential device 28 disposed to be rotatable about a fourth rotation axis CL4 (hereinafter referred to as "fourth axis CL4") and right and left front axles 30r, 30l disposed to be rotatable about the fourth axis CL4. A planetary gear device 32, a first rotating machine MG1 and an output gear 34 are disposed to be coaxial with the input shaft 22 and are located radially outside the input shaft 22. A reduction gear 36 is disposed on the power transmission shaft. The second electric motor MG2 is connected to an axial end portion of the power transmission shaft 24 in a power transmittable manner. A counter gear 38 meshing with the output gear 34 and a differential drive gear 42 meshing with a differential ring gear 40 of the differential device 28 are disposed on the counter shaft 26. All of these rotary members are disposed inside the casing 44 as a non-rotary member. Since the first, second, third and fourth axes CL1, CL2, CL3, CL4 are parallel to one another, directions of the respective first, second, third and fourth axes CL1, CL2, CL3, CL4 are the same as one another. Hereinafter, each of the directions of the respective first, second, third and fourth axes CL1, CL2, CL3, CL4 will be referred to as "the direction of the rotation axis CL".

Each of the first and second rotating machines MG1, MG2 may be an electric motor having a function of a motor operable to convert an electric energy into a mechanical drive power and/or a function of a generator operable to convert a mechanical drive power into an electric energy, and preferably, is a motor generator having both of the functions so as to be operated as a selected one of the motor and the generator. In the present embodiment, the first rotating machine MG1 has a function of an electric generator operable to receive a reaction force from the engine 12, and a function of a rotating machine operable to start the engine 12 while the engine 12 is at rest. Meanwhile, the second rotating machine MG2 has a function of an electric motor functioning as a drive power source to generate a drive power, and a function of an electric generator operable to perform a regenerative operation for converting a reverse drive power received from the front wheels 14, into an electric energy.

The input shaft 22 is disposed to be rotatable about the first axis CL1. The input shaft 22 is connected to a crank shaft 12a of the engine 12 through members such as a damper (not shown), in a power transmittable manner. The input shaft 22 is held, through members such as a bearing 46, by the casing 44 as the non-rotary member, such that the input shaft 22 is rotatable about the first axis CL1. The planetary gear device 32, first rotating machine MG1 and output gear 34 are disposed to be coaxial with the input shaft 22 and are located radially outside the input shaft 22.

The planetary gear device 32, which is disposed to be coaxial with the first axis CL1, is a single-pinion type planetary gear device (differential mechanism) that includes a sun gear S, a carrier CA and a ring gear R. The planetary gear device 32 serves as a power distributing mechanism configured to distribute the power of the engine 12 to the first rotating machine MG1 and the output gear 34. The sun gear S of the planetary gear device 32 is connected to the first rotating machine MG1 in a power transmittable manner. The carrier CA of the planetary gear device 32 is connected to the engine 12 through, for example, the input shaft 22 in a power transmittable manner. The ring gear R of the planetary gear device 32 is connected to the output gear 34 in a power transmittable manner.

The first rotating machine MG1 is disposed in a position adjacent to the planetary gear device 32, with a partition wall 48 (that is a part of the casing 44) being located between the first rotating machine MG1 and the planetary gear device 32 in a direction of the rotation axis CL. The first rotating machine MG1 includes an annular-shaped stator core 50 that is unrotatably fixed to the casing 44, an annular-shaped rotor 52 disposed on an inner peripheral side of the stator core 50, and a rotor shaft 54 connected to an inner periphery of the rotor 52. The stator core 50 is provided with stator coils 56 wound thereon. The rotor shaft 54 is held at its axially opposite end portions by the casing 44 through a pair of bearings 58a, 58b, such that the rotor shaft 54 is rotatable about the first axis CL1.

The output gear 34 is connected to the ring gear R of the planetary gear device 32, and meshes with the counter gear 38 that is disposed on the counter shaft 26. It is noted that the ring gear R and the output gear 34 are formed integrally with each other, namely, are constituted by a compound gear.

The power transmission shaft 24 is disposed to be rotatable about the second axis CL2, and is rotatably held at its axially opposite end portions by the casing 44 through a pair of bearings 70a, 70b. The reduction gear 36 is disposed on the power transmission shaft 24. The second rotating machine MG2 is connected to an axial end portion of the power transmission shaft 24 in a power transmittable manner. The partition wall 48 is located between the second rotating machine MG2 and the reduction gear 36 in the direction of the rotation axis CL.

The second rotating machine MG2 includes an annular-shaped stator core 60 that is unrotatably fixed to the casing 44, an annular-shaped rotor 62 disposed on an inner peripheral side of the stator core 60, and a rotor shaft 64 connected to an inner periphery of the rotor 62. The stator core 60 is provided with stator coils 66 wound thereon. The rotor shaft 64 is held at its axially opposite end portions by the casing 44 through a pair of bearings 68a, 68b, such that the rotor shaft 64 is rotatable about the second axis CL2.

The reduction gear 36 is formed integrally with the power transmission shaft 24, and meshes with the counter gear 38 disposed on the counter shaft 26. The number of teeth of the reduction gear 36 is smaller than the number of teeth of the counter gear 38. Thus, rotation of the second rotating machine MG2 is transmitted to the counter shaft 26 through the reduction gear 36 and the counter gear 38, such that a rotational speed of the counter shaft 26 is made lower than a rotational speed of the second rotating machine MG2.

The counter shaft 26 is provided to be rotatable about the third axis CL3. The counter shaft 26 is held at its axially opposite end portions by the casing 44 through a pair of bearings 73a, 73b, such that the counter shaft 26 is rotatable about the third axis CL3. The counter gear 38 and the differential drive gear 42 are disposed on the counter shaft 26, unrotatably relative to the counter shaft 26 that is to be rotated about the third axis CL3.

The counter gear 38 meshes with the output gear 34 and the reduction gear 36 so that the power outputted from the engine 12 and/or the power outputted from the second rotating machine MG2 are to be transmitted. The differential drive gear 42 meshes with the differential ring gear 40 of the differential device 28. Thus, when the power outputted from the engine 12 and/or the power outputted from the second rotating machine MG2 are transmitted to the counter gear 38 through the output gear 34 and/or the reduction gear 36, the power or powers are transmitted to the differential device 28 through the counter shaft 26 and the differential drive gear 42.

The differential device 28 and the front axles 30r, 30l are disposed to be rotatable about the fourth axis CL4. The differential device 28 is constituted by a well-known differential mechanism, and is configured to transmit the power to the right and left axles 30r, 30l while allowing rotation of each of the axles 30r, 30l relative to the other of the axles 30r, 30l. It is noted that detailed description of the differential device 28, which is a known device, is not provided. The differential device 28 is held, at its opposite end portions that are opposite to each other in the direction of the rotation axis CL, by the casing 44 through a pair of bearings 75a, 75b, such that the differential device 28 is rotatable about the fourth axis CL4.

In the driving apparatus 10 constructed as described above, the power of the engine 12 is transmitted to the right and left front wheels 14r, 14l through the planetary gear device 32, output gear 34, counter gear 38, counter shaft 26, differential drive gear 42, differential device 28 and axles 30r, 30l in this order of description. Further, the power of the second rotating machine MG2 is transmitted to the right and left front wheels 14r, 14l through the rotor shaft 64, power transmission shaft 24, reduction gear 36, counter gear 38, counter shaft 26, differential drive gear 42, differential device 28 and front axles 30r, 30l in this order of description.

The casing 44 of the driving apparatus 10 is constituted by a housing 44a, an axle casing 44b and a casing cover 44c that are fixed to one another. The axle casing 44b opens in its opposite ends that are opposite to each other in the direction of the rotation axis CL. The axle casing 44b is fixedly connected at one of the openings to the housing 44a through screw bolts, such that the one of the openings is enclosed by the housing 44a. The axle casing 44b is fixedly connected at the other of the openings to the casing cover 44c through screw bolts, such that the other of the openings is enclosed by the casing cover 44c. Each of the housing 44a and the casing cover 44c has an attitude substantially perpendicular to the rotation axis CL. It is noted that the casing cover 44c corresponds to "cover (covering the rotating machine)" recited in the appended claims.

The axle casing 44b is provided with the partition wall 48 that extends in a direction substantially perpendicular to the rotation axis CL. By provision of the partition wall 48, an interior of the casing 44 is sectioned into a gear room 49 and a motor room 51, such that the gear room 49 is covered by the housing 44a and the axle casing 44b while the motor room 51 is covered by the axle casing 44b and the casing cover 44c. Various gears or devices such as the planetary gear device 32, output gear 34, counter gear 38, reduction gear 36 and differential device 28 are disposed in the gear room 49. The first and second rotating machines MG1, MG2 are disposed in the motor room 51. The casing cover 44c is adjacent to the first and second rotating machines MG1, MG2 in the direction of the rotation axis CL.

The driving apparatus 10 further includes a mechanical oil pump 45 which is to be driven by the engine 12. The oil pump 45 is disposed on the first axis CL1, and is located on a side of one of axially opposite end portions of the input shaft 22, which is remote from the engine 12. The oil pump 45 is attached to the casing cover 44c that serves also as a pump body. The oil pump 45 includes a drive gear (not shown) that is connected to the above-described one of the axially opposite end portions of the input shaft 22, so that the oil pump 45 is to be driven by rotation of the engine 12. Thus, with the engine 12 being rotated, the oil pump 45 is to be driven and operated.

Figure 2:
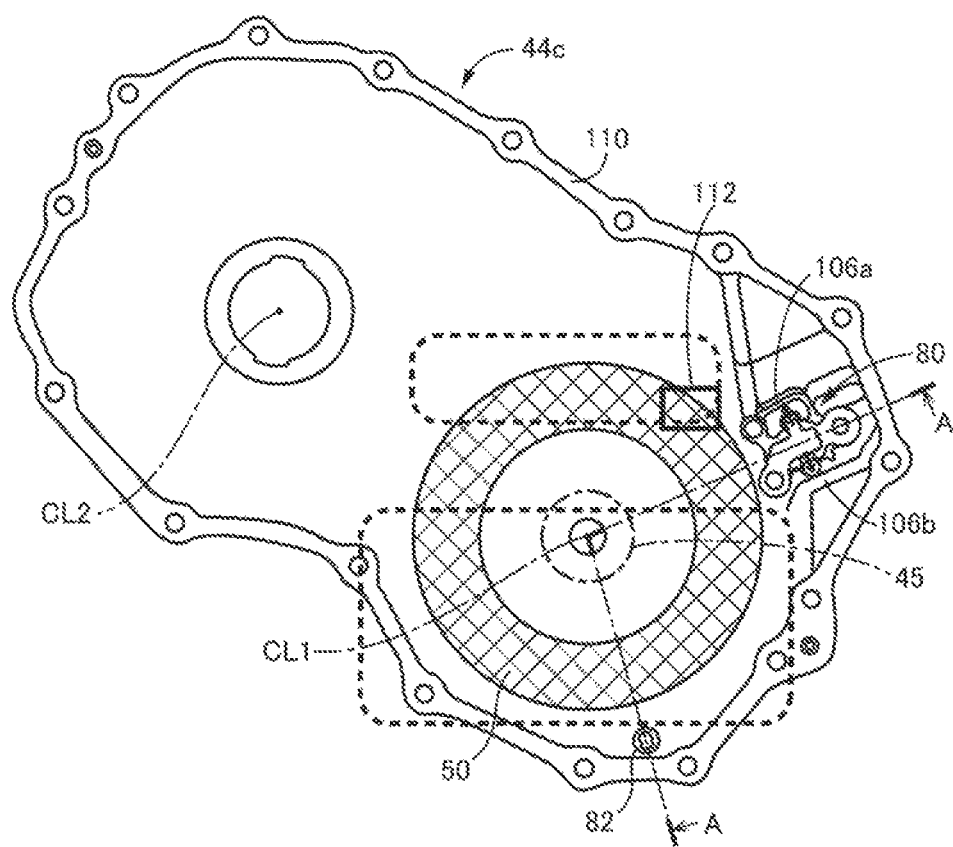
FIG. 2 is a view showing a casing cover shown FIG. 1, as seen in a direction parallel to a first axis.

FIG. 2 is a view showing the casing cover 44c shown FIG. 1, as seen in the direction of the rotation axis CL. It is noted that FIG. 2 shows an installed state in which the driving apparatus 10 is installed in a vehicle that is on a flat road surface, and that an upward direction in the drawing sheet corresponds to an upward direction of the driving apparatus 10 in the installed state. In FIG. 2, the first axis CL1 about which the first rotating machine MG1 is to be rotated and the second axis CL2 about which the second rotating machine MG2 is to be rotated are shown. In FIG. 2 showing that the first rotating machine MG1 and the oil pump 45 are disposed on the first axis CL1, a lattice part corresponds to a part in which the stator core 50 of the first rotating machine MG1 is disposed, and a one-dot chain line indicates a part in which the oil pump 45 is disposed. As shown in FIG. 2, a relief valve 80 is provided in a position which is located on an upper side of the first axis CL1 and on an outer peripheral side of the stator core 50 of the first rotating machine MG1. When a hydraulic pressure of an oil supplied from the oil pump 45 exceeds a predetermined value, the relief valve 80 is opened so as to discharge the oil into the motor room 51. With the oil being discharged from the relief valve 80, the hydraulic pressure of the oil supplied from the oil pump 45 is reduced whereby a hydraulic pressure circuit (to which the oil is to be supplied as an original pressure from the oil pump 45) is protected. Further, as shown in FIG. 2, a strainer hole 82 is provided on a lower side of the first rotating machine MG1, so as to serve as an inlet through which the oil stored inside the casing 44 is to be pumped up.

Figure 3:
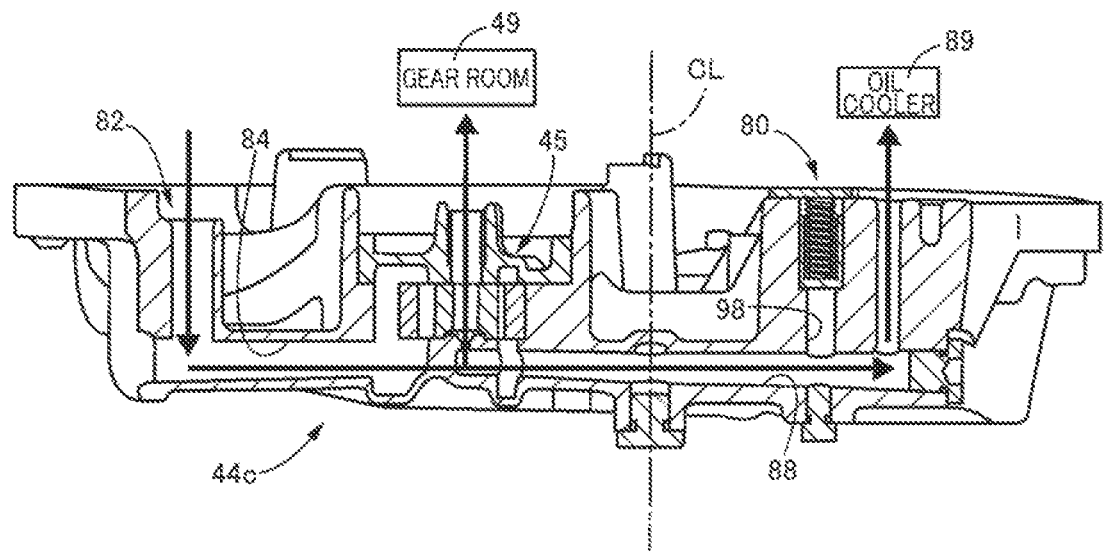
FIG. 3 is a cross-sectional view taken in a line A-A shown in FIG. 2.

FIG. 3 is a cross-sectional view of the casing cover 44c, taken in a line A-A shown in FIG. 2. FIG. 3 shows oil passages defined in only the casing cover 44c. In FIG. 3, arrows indicate flow of the oil in the oil passage defined in the casing cover 44c. When the oil pump 45 is driven, the oil pumped up through the strainer hole 82, and the oil is caused to flow into the oil pump 45 through an oil passage 84 and an inlet of the oil pump 45 and to flow out to an oil passage 88 from the oil pump 45 through an outlet of the oil pump 45. The oil flowing out from the oil pump 45 is supplied to the gear room 49 through an oil passage hole provided in a pump rotor (now shown) by which the oil pump 45 is to be driven, and also to an oil cooler 89 through the oil passage 88.

Figure 4:
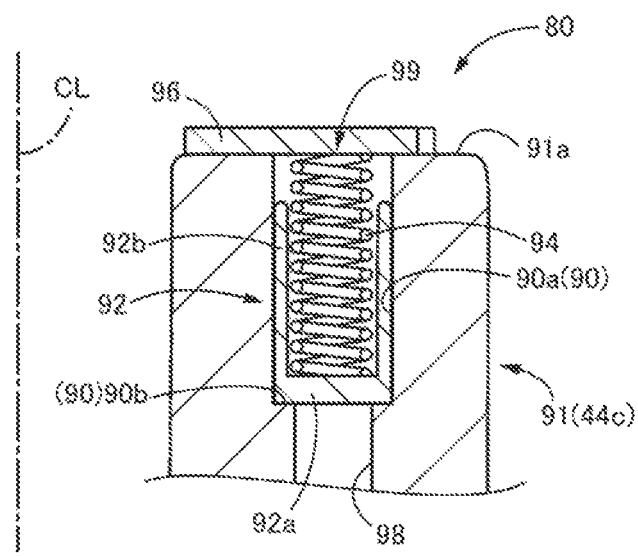
FIG. 4 is an enlarged view of a relief valve shown in FIG. 3.

The casing cover 44c is provided with the relief valve 80 that is to be opened when the hydraulic pressure of the oil flowing in the oil passage 88 exceeds a predetermined value, so as to discharge the oil. The relief valve 80 is connected to the oil passage 88 through a connecting oil passage 98. FIG. 4 is an enlarged view of the relief valve 80 shown in FIG. 3. As shown in FIG. 4, the relief valve 80 includes: a cylindrical-shaped space in the form of a cylinder room 90 that is provided in a thick portion 91 that is a part of the casing cover 44c; a sleeve 92 which is disposed inside the cylinder room 90 and which is fitted in an inner wall 90a of the cylinder room 90 such that the sleeve 92 is slidable relative to the inner wall 90a of the cylinder room 90; a spring 94 which is disposed inside the sleeve 92 and which constantly forces or biases the sleeves 92 toward a valve closing position that closes the relief valve 80; and a plate member 96 which closes an opening 99 of the cylinder room 90.

The thick portion 91 of the casing cover 44c protrudes in the direction of the rotation axis CL, and has a predetermined thickness in the direction of the rotation axis CL. The cylinder room 90 is a cylindrical-shaped space provided in the thick portion 91. The cylinder room 90 has a bottom wall 90b that faces a connecting oil passage 98 communicating with the oil passage 88 provided in the casing cover 44c. Further, the cylinder room 90 has the opening 99 that is closed by the plate member 96.

The sleeve 92 has a bottom plate portion 92a and a cylindrical portion 92b that extends substantially perpendicularly from an outer peripheral edge of the bottom plate portion 92a. The bottom plate portion 92a is normally in contact with the bottom wall 90b of the cylinder room 90. The cylindrical portion 92b is slidably fitted in the inner wall 90a of the cylinder room 90, so that the sleeve 92 is movable within the cylinder room 90 in the direction of the rotation axis CL (corresponding to a vertical direction of the drawing sheet), i.e., a direction substantially perpendicular to a mating surface 110 (see FIG. 2) of the casing cover 44c.

The spring 94 is a coil spring that is disposed inside the cylindrical portion 92b of the sleeve 92 in the cylinder room 90. The spring 94 is in contact at its longitudinally opposite ends with the plate member 96 and the bottom plate portion 92a of the sleeve 92. The spring 94, which is received in the cylinder room 90, is pre-loaded to bias or constantly force the sleeve 92 toward the bottom wall 90b of the cylinder room 90.

Figure 5:
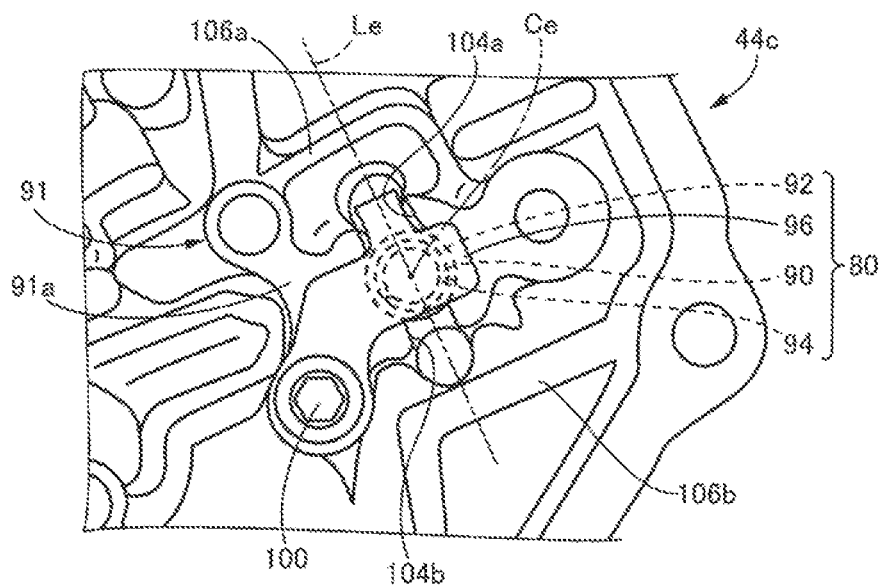
FIG. 5 is a view showing the relief valve, as seen in a direction perpendicular to a mating surface of the casing cover.

The plate member 96, which closes the opening 99 of the cylinder room 90, is fixed onto a top portion 91a of the thick portion 91 through a screw bolt 100 (see FIG. 5).

FIG. 4 shows a state in which the hydraulic pressure of the oil flowing in the connecting oil passage 98 is low. In this state, the force of the spring 94 is larger than a force which is based on the hydraulic pressure of the oil and which forces the sleeve 92 in a direction away from the bottom wall 90b, so that the bottom plate portion 92a of the sleeve 92 is in contact with the bottom wall 90b, whereby the relief valve 80 is in its closed state, namely, communication between the cylinder room 90 and the connecting oil passage 98 is cut off.

On the other hand, when the hydraulic pressure of the oil flowing in the connecting oil passage 98 exceeds the predetermined value, the sleeve 92 is moved against the force of the spring 94 in the direction away from the bottom wall 90b (i.e., upward direction in the drawing sheet), whereby the cylinder room 90 and the connecting oil passage 98 are brought into communication with each other, so that the oil flowing in the connecting oil passage 98 is caused to flow into the cylinder room 90. The oil flowing into the cylinder room 90 is released toward the motor room 51 through first and second cutouts 104a, 104b, which are provided in the thick portion 91 as described below.

Figure 6:
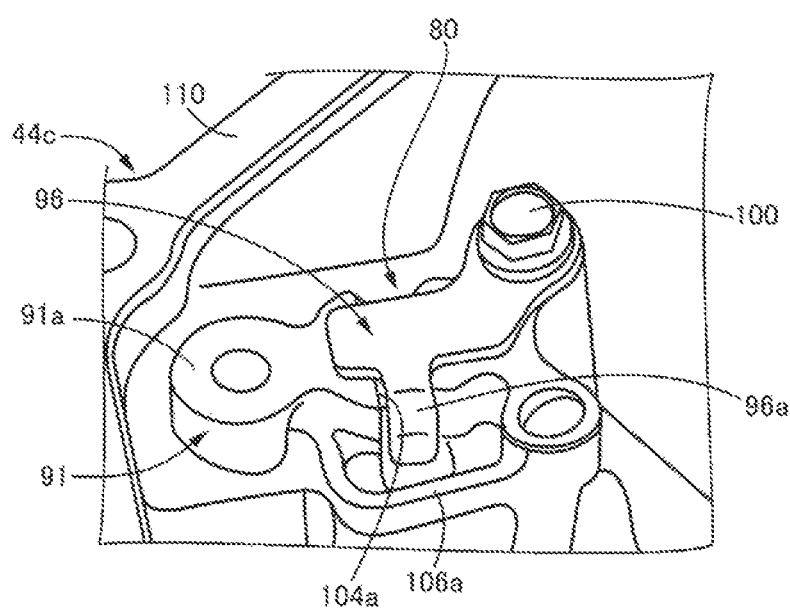
FIG. 6 is a perspective view of the relief valve.

FIG. 5 is a view showing the relief valve 80, as seen in the direction of the rotation axis CL, namely, a direction perpendicular to the mating surface 110 of the casing cover 44c. FIG. 6 is a perspective view of the relief valve 80. As shown in FIGS. 5 and 6, the casing cover 44c includes the thick portion 91 having the predetermined thickness in the direction of the rotation axis CL. The predetermined thickness of the thick portion 91 in the direction of the rotation axis CL is large enough to provide the cylinder room 90 in the thick portion 91. The plate member 96 is fixed to the top portion 91a having a flat surface, through the screw bolt 100. Further, as shown in FIG. 5, the cylinder room 90 as a cylindrical space, which is indicated by broken line, is provided in a portion of the thick portion 91 which is covered by the plate member 96. Still further, the sleeve 92 and the spring 94 indicated by respective broken lines are received in the cylinder room 90.

Further, the thick portion 91 is provided with a pair of cutouts 104a, 104b, i.e., the first and second cutouts 104a, 104b that communicate with the inner wall 90a of the cylinder room 90. The first and second cutouts 104a, 104b are disposed in respective positions that are symmetrical with each other with respect to a center Ce of the cylinder room 90, as viewed in the direction of the rotation axis CL, i.e., the direction perpendicular to the mating surface 110 of the casing cover 44c. That is, the first and second cutouts 104a, 104b, which are provided in the thick portion 91, lie on a straight line Le passing through the center Ce of the cylinder room 90, as viewed in the direction perpendicular to the mating surface 110 of the casing cover 44c. It is noted that the first and second cutouts 104a, 104b correspond to "at least one cutout" recited in the appended claims.

Each of the first and second cutouts 104a, 104b is formed to extend from the inner wall 90a of the cylinder room 90 in the direction substantially perpendicular to the rotation axis CL. That is, each of the first and second cutouts 104a, 104b is formed to extend along the straight line Le which passes through the center Ce of the cylinder room 90 and which is substantially perpendicular to the rotation axis CL. Thus, each of the first and second cutouts 104a, 104b communicates between the inner wall 90a of the cylinder room 90 and an outer wall of the thick portion 91. Further, each of the first and second cutouts 104a, 104b is formed to extend from the top portion 91a of the thick portion 91 to the same depth as the bottom wall 90b of the cylinder room 90 (or to the same depth as vicinity of the bottom wall 90b) in the direction of the rotation axis CL, i.e., the direction perpendicular to the mating surface 110 of the casing cover 44c. Therefore, the oil flowing into the cylinder room 90 is released toward the motor room 51 via the first and second cutouts 104a, 104b.

Figure 7:
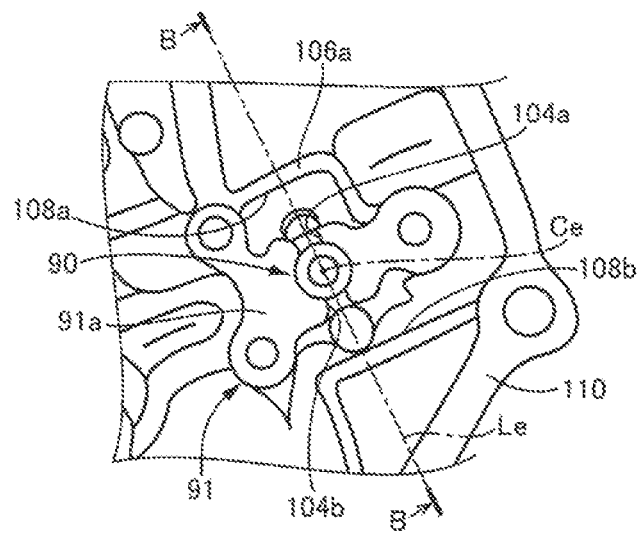
FIG. 7 is a view, as seen in the direction perpendicular to the mating surface of the casing cover, as the view of FIG. 5, showing a state in which a plate member, a sleeve and a spring are removed.
Figure 8:
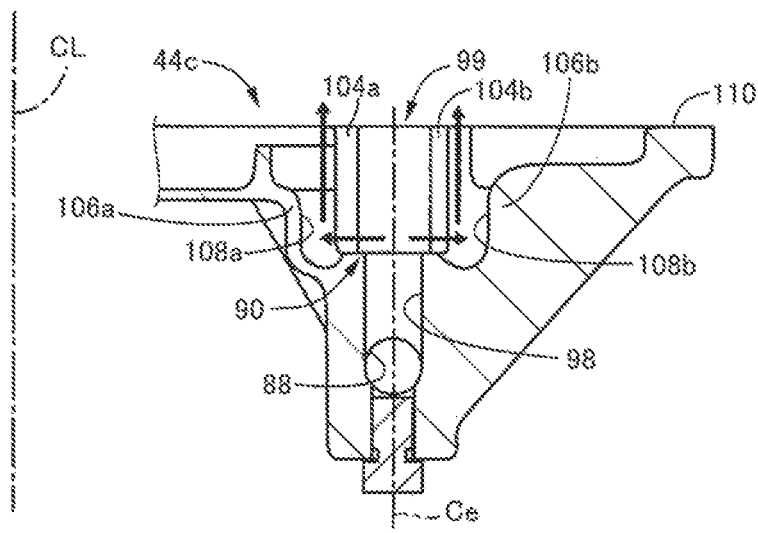
FIG. 8 is a cross-sectional view taken in a line B-B shown in FIG. 7.

The casing cover 44c is provided with a first rib 106a which is located in a position opposed to the first cutout 104a in a direction of the straight line Le, and which extends in the direction of the rotation axis CL, i.e., the direction substantially perpendicular to the mating surface 110 of the casing cover 44c. The first rib 106a as well as the first cutout 104a lies on the straight line Le, so as to be opposed to the first cutout 104 in the direction of the straight line Le. Further, the casing cover 44c is provided with a second rib 106b which is located in a position opposed to the second cutout 104b in the direction of the straight line Le, and which extends in the direction of the rotation axis CL, i.e., the direction substantially perpendicular to the mating surface 110 of the casing cover 44c. The second rib 106b as well as the second cutout 104b lies on the straight line Le, so as to be opposed to the second cutout 104b in the direction of the straight line Le. FIG. 7 is a view showing a state in which the above-described plate member 96, sleeve 92 and spring 94 are removed, as seen in the direction of the rotation axis CL, as the view of FIG. 5. FIG. 8 is a cross-sectional view taken in a line B-B shown in FIG. 7. It is noted that the first and second ribs 106a, 106b correspond to "at least one rib" recited in the appended claims.

As shown in FIG. 7, the thick portion 91 is provided with the cylinder room 90 that is the cylindrical space, and also the first and second cutouts 104a, 104b that are in communication with the cylinder room 90. Further, the casing cover 44c is provided with the first and second ribs 106a, 106b which lie on the straight line Le passing through the center Ce of the cylinder room 90 and which are opposed to the first and second cutouts 104a, 104b, respectively, in the direction of the straight line Le. As shown in FIG. 8, each of the first and second ribs 106a, 106b extends substantially perpendicularly to the mating surface 110 of the casing cover 44c. The first rib 106a has a first opposed surface 108a which is opposed to the first cutout 104a and which is substantially perpendicular to the mating surface 110 of the casing cover 44c. The second rib 106b has a second opposed surface 108b which is opposed to the second cutout 104b and which is substantially perpendicular to the mating surface 110 of the casing cover 44c.

There will be described advantageous effects provided owing to provision of the above-described first cutout 104a, second cutout 104b, first rib 106a and second rib 106b. As described above, when the hydraulic pressure of the oil flowing in the connecting oil passage 98 exceeds the predetermined value, the relieve valve 80 is opened whereby the oil flowing in the connecting oil passage 98 is caused to flow into the cylinder room 90. In this instance, since the thick portion 91 is provided with the first and second cutouts 104a, 104b each of which communicates between the inner wall 90a of the cylinder room 90 and an outer wall of the thick portion 91, the oil flowing into cylinder room 90 is caused to flow out toward the motor room 51 through the first and second cutouts 104a, 104b. When flowing out toward the motor room 51 through the first and second cutouts 104a, 104b, the oil is caused is flow along the straight line Le on which the first and second ribs 106a, 106b opposed to the respective first and second cutouts 104a, 104b are disposed. Therefore, the oil flowing out through the first cutout 104a collides with the first opposed surface 108a of the first rib 106a, whereby a direction of the flow of the oil is changed to the direction of the rotation axis CL, i.e., the direction substantially perpendicular to the mating surface 110 of the casing cover 44c. Similarly, the oil flowing out through the second cutout 104b collide with the second opposed surface 108b of the second rib 106b, whereby a direction of the flow of the oil is changed to the direction of the rotation axis CL, i.e., the direction substantially perpendicular to the mating surface 110 of the casing cover 44c.

In FIG. 8, arrows indicate the above-described flow of the oil. With the oil being released as indicated by the arrows in FIG. 8, the oil is released toward the first rotating machine MG1 disposed in the motor room 51, in the direction of the rotation axis CL. Consequently, the oil discharged from the relief valve 80 is caused to reach even an end portion of the first rotating machine MG, which is remote from the casing cover 44c in the direction of the rotation axis CL, so that the first rotating machine MG1 can be efficiently cooled by the oil discharged from the relief valve 80. For example, a portion of the stator core 50, which is located in a region surrounded by broken line on an upper side of the first axis CL1 in FIG. 2, can be efficiently cooled by the oil discharged from the relief valve 80 through the first cutout 104a. Further, a portion of the stator core 50, which is located in another region surrounded by another broken line in FIG. 2 and which corresponds to a lower portion of the first rotating machine MG1, can be efficiently cooled by the oil discharged from the relief valve 80 through the second cutout 104b. The first rotating machine MG1 can be advantageously cooled, particularly, with the oil discharged from the relief valve 80 being released toward the portion of the stator core 50 corresponding to the lower portion of the first rotating machine MG1, wherein this portion of the stator core 50 (corresponding to the lower portion of the first rotating machine MG1) is unlikely to receive an oil released from a coolant pipe (not shown) that is provided on an upper side of the first rotating machine MG1.

Further, since the oil discharged through the first and second cutouts 104a, 104b collides with the first and second ribs 106a, 106b, it is possible to prevent the oil discharged through the first and second cutouts 104a, 104b, from being applied directly to the mating surface 110 of the casing cover 44c. Further, since the oil discharged through the first and second cutouts 104a, 104b collides with the first and second ribs 106a, 106b, it is possible to prevent the oil discharged through the first and second cutouts 104a, 104b, from being applied directly to a thermistor (thermally sensitive resistor) 112, which is provided in a portion surrounded by solid line defining a rectangle in FIG. 2, so as to detect a temperature of the first rotating machine MG1.

Further, since the first and second cutouts 104a, 104b are disposed in the respective positions that are symmetrical with each other with respect to the cylinder room 90, the oil is discharged from the cylinder room 90 through the positions symmetrical with each other. Therefore, in process of discharge of the oil from the cylinder room 90 through the first and second cutouts 104a, 104b, it is possible to suppress inclination of the sleeve 92 relative to the inner wall 90a of the cylinder room 90 and accordingly to reduce wears of the sleeve 92 and the inner wall 90a of the cylinder room 90 that are in sliding contact with each other.

Further, the plate member 96 includes a bent portion 96a, as shown in FIGS. 5 and FIG. 6. The bent portion 96a is bent in a direction substantially perpendicularly to a flat surface portion of the plate member 96. The bent portion 96a is engaged or fitted in the first cutout 104a so as to prevent the plate member 96 (that is attached to the top portion 91a of the thick portion 91) from being rotated relative to the thick portion 91 about the screw bolt 100. Thus, the plate member 96 can be unrotatably fixed to the thick portion 91 even with the single screw bolt 100.

As described above, in the present embodiment, when the hydraulic pressure of the oil supplied from the oil pump 45 exceeds the predetermined value, the relief valve 80 is opened whereby the oil is discharged through the first and second cutouts 104a, 104b provided in the thick portion 91. Since each of the first and second ribs 106a, 106b is disposed in the position opposed to the corresponding one of the first and second cutouts 104a, 104b, the oil discharged through the first and second cutouts 104a, 104b collides with the first and second ribs 106a, 106b whereby the direction of flow of the oil is changed to the direction of the rotation axis CL. Consequently, the oil is released toward the first rotating machine MG1 in the direction of the rotation axis CL so that the first rotating machine MG1 can be efficiently cooled by the oil discharged from the relief valve 80.

Further, in the present embodiment, each of the first and second cutouts 104a, 104b extends along the straight line Le which passes the center Ce of the cylinder room 90 and which is substantially perpendicular to the rotation axis CL, so that the oil discharged from the cylinder room 90 through the first and second cutouts 104a, 104b is released along the straight line Le. Further, the first and second ribs 106a, 106b is disposed in the position that overlaps with the straight line Le, so that the oil discharged through the first and second cutouts 104a, 104b collides with the first and second ribs 106a, 106b whereby the direction of flow of the oil is changed by the first and second ribs 106a, 106b to the direction of the rotation axis CL. Further, the first and second cutouts 104a, 104b are disposed in the respective positions that are symmetrical with each other with respect to the center Ce of the cylinder room 90, as viewed in the direction of the rotation axis CL, so that the oil is discharged through the first and second cutouts 104a, 104b disposed in the respective positions that are symmetrical with each other. Consequently, it is possible to suppress inclination of the sleeve 92 disposed in the cylinder room 90, and accordingly to reduce wear that could be caused by collision of the inclined sleeve 92 with the inner wall 90a of the cylinder room 90. Moreover, the plate member 96 is prevented from being rotated, by the bent portion 96a of the plate member 96 that is fitted in the first cutout 104a, so that the plate member 96 can be fixed to the thick portion 91 with the single screw bolt 100.

While the preferred embodiment of this invention has been described in detail by reference to the drawings, it is to be understood that the invention may be otherwise embodied.

For example, in the above-described embodiment, the oil discharged from the relief valve 80 is adapted to be released toward exclusively the first rotating machine MG1 in the direction of the rotation axis CL. However, the oil discharged from the relief valve 80 may be adapted to be released toward the second rotating machine MG2.

In the above-described embodiment, the thick portion 91 is provided with the first and second cutouts 104a, 104b. However, the number of the cutouts does not necessarily have to be two, but may be only one or three or more, for example.

In the above-described embodiment, the first and second cutouts 104a, 104b are disposed on the straight line Le passing through the center Ce of the cylinder room 90, in other words, a straight line connecting between the first cutout 104a and the center Ce of the cylinder room 90 and a straight line connecting between the second cutout 104b and the center Ce of the cylinder room 90 define 180° therebetween. However, this arrangement is not essential. That is, the straight line connecting between the first cutout 104a and the center Ce of the cylinder room 90 and the straight line connecting between the second cutout 104b and the center Ce of the cylinder room 90 may define an angle other than 180° therebetween.

In the above-described embodiment, each of the first and second opposed surfaces 108a, 108b is substantially perpendicular to the mating surface 110 of the casing cover 44c. However, each of the first and second opposed surfaces 108a, 108b does not necessarily have to be perpendicular to the mating surface 110 of the casing cover 44c. That is, an angle each of the first and second opposed surfaces 108a, 108b with respect to the mating surface 110 may be adjusted or changed as needed such that the direction of the flow of the oil that collides with the first and second opposed surfaces 108a, 108b is changed to the direction of the rotation axis CL such that the oil can reach a target portion of the rotating machine.

In the above-described embodiment, the oil pump 45 is disposed on the first axis CL1 about which the first rotating machine MG1 is to be rotated. However, the oil pump 45 does not necessarily have to be disposed on the first axis CL1. For example, the oil pump 45 may be disposed on the second axis CL2 about which the second rotating machine MG2 is to be rotated, such that the oil pump 45 is to be driven by rotation of the rotor shaft 64 of the second rotating machine MG2.

In the above-described embodiment, the cylinder room 90 has a cylindrical shape. However, the cylinder room 90 does not necessarily have to have the cylindrical shape but may have a quadrangular prism shape or other shape. That is, the shape of the cylinder room 90 may be changed as need as long as the changed shape allows the sleeve 92 to slide on the inner wall 90a of the cylinder room 90.

In the above-described embodiment, the vehicle driving apparatus 10 is to be provided in the hybrid vehicle in which the engine 12 and the second rotating machine MG2 serve as the drive power sources for driving the vehicle. However, the present invention may be applied also to an electric vehicle in which only a rotating machine serves as the drive power source, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle driving apparatus
44c: casing cover (cover)
45: oil pump
80: relief valve
90: cylinder room
91: thick portion
92: sleeve
94: spring
96: plate member
96a: bent portion
104a: first cutout (cutout)
104b: second cutout (cutout)
106a: first rib (rib)
106b: second rib (rib)
MG1: first rotating machine (rotating machine)
MG2: second rotating machine (rotating machine)
CL: rotation axis
Ce: center of cylinder room
Le: straight line

What is claimed is:

1. A vehicle driving apparatus comprising:
a rotating machine;
a cover covering the rotating machine and including a thick portion having a predetermined thickness in a direction of a rotation axis of the rotating machine;
an oil pump attached to the cover; and
a relief valve provided in the cover, and configured to discharge an oil supplied from the oil pump when a hydraulic pressure of the oil exceeds a predetermined value,
wherein the cover is disposed to be adjacent to the rotating machine in the direction of the rotation axis of the rotating machine, and has an attitude substantially perpendicular to the rotation axis,
wherein the relief valve includes a cylinder room that is provided in the thick portion,
wherein the thick portion is provided with at least one cutout extending from an inner wall of the cylinder room in a direction substantially perpendicular to the rotation axis,
wherein the cover is provided with at least one rib, the at least one rib being disposed in a position opposed to a corresponding one of the at least one cutout in a direction perpendicular to the rotation axis of the rotating machine, and extending in the direction of the rotation axis,
wherein the at least one cutout includes a first cutout and a second cutout that are disposed in respective positions that are symmetrical with each other with respect to a center of the cylinder room, as viewed in the direction of the rotation axis, and
wherein the at least one rib includes a first rib and a second rib that are disposed in respective positions that are opposed in a direction perpendicular to the rotation axis of the rotating machine to the first cutout and the second cutout, respectively, as viewed in the direction of the rotation axis.

2. The vehicle driving apparatus according to claim 1,
wherein the at least one cutout extends along a straight line which passes a center of the cylinder room and which is substantially perpendicular to the rotation axis, as viewed in the direction of the rotation axis, and
wherein the at least one rib overlaps with the straight line, as viewed in the direction of the rotation axis.

3. The vehicle driving apparatus according to claim 1,
wherein the relief valve includes: a sleeve which is disposed inside the cylinder room and which is slidable relative to the inner wall of the cylinder room; a spring which is disposed inside the sleeve and which forces the sleeve toward a valve closing position that closes the relief valve; and a plate member which is attached to a top portion of the thick portion and which closes an opening of the cylinder room.

4. The vehicle driving apparatus according to claim 3,
wherein the plate member, which is attached to the top portion of the thick portion, includes a bent portion that is fitted in one of the at least one cutout.

5. The vehicle driving apparatus according to claim 1, further comprising a motor room that houses the rotating machine,
wherein the cylinder room of the relief valve is a chamber into which the oil is to be discharged when the hydraulic pressure of the oil exceeds the predetermined value, and
wherein the cylinder room is in communication with the motor room through the at least one cutout, such that the oil discharged into the cylinder room is supplied to the motor room through the at least one cutout.

* * * * *